United States Patent [19]
Watanabe et al.

[11] Patent Number: 5,327,289
[45] Date of Patent: Jul. 5, 1994

[54] LUMINOUS FLUX SEPARATING OPTICAL SYSTEM

[75] Inventors: Fumio Watanabe; Satoshi Yahagi, both of Omiya, Japan

[73] Assignee: Fuji Photo Optical Co., Ltd., Saitama, Japan

[21] Appl. No.: 791,393

[22] Filed: Nov. 14, 1991

[30] Foreign Application Priority Data

Nov. 15, 1990 [JP] Japan ................ 2-309086

[51] Int. Cl.$^5$ .............. G02B 27/10; H04N 9/097
[52] U.S. Cl. ...................... 359/634; 359/637
[58] Field of Search ............ 359/634, 637, 833, 834, 359/583; 358/55

[56] References Cited

U.S. PATENT DOCUMENTS 3,720,457  3/1973  Swartz et al. .................. 359/496
3,905,684  9/1975  Cook et al. ..................... 359/634
3,982,819  9/1976  Letellier ........................ 356/496

FOREIGN PATENT DOCUMENTS 46424  4/1979  Japan ......................... 358/55

*Primary Examiner*—Jon W. Henry

[57] ABSTRACT

A color separation prism system for use in a TV camera which can separate R, G and B colors. The color separation prism system of the invention includes one or more air gaps each of which is formed between the prisms in a wedge shape that is open on the converging side of a luminous flux passing through the air gap. The use of the wedge-shaped air gap can reduce the possibility of generation of an astigmatism to thereby prevent deterioration of the performance of an optical system formed of the above-mentioned color separation prisms.

26 Claims, 3 Drawing Sheets

LUMINOUS FLUX SEPARATING OPTICAL SYSTEM

BACKGROUND OF THE INVENTION

1. Field of the Invention

The present invention relates to a luminous flux separating optical system and, in particular, to a color separation prism which can be used in a TV camera and the like.

2. Description of the Related Art

An image luminous flux formed by a lens is often separated and image processed for various purposes. It is conventionally known that, as means for separating such luminous flux, there has been used a luminous flux separating optical system which is composed of a plurality of prisms. For example, in a color TV camera, the image luminous flux is image-processed by separating the luminous flux into a RED component, a GREEN component and a BLUE component. For such color separation, as shown in FIG. 1, a prism 101 is covered on the luminous flux leaving surface 12, with a dichroic coating which can reflect only the BLUE component, and the reflected light of the BLUE component is totally reflected by a surface 11 and is then image-formed on a BLUE image pick-up element 15. The remaining luminous components are allowed to pass through an air gap 18 and, after then, only the RED component is reflected by a dichroic coating which is coated on a surface 14 and is able to reflect the RED component. The reflected RED component is totally reflected due to a difference between the indices of refraction of the air gap and a prism glass and is then image-formed on a RED image pick-up element 16. The remaining luminous flux component is the GREEN component, which is image-formed on a GREEN image pick-up element 17. This is a typical conventional method of separating a luminous flux. There are other known luminous flux optical systems according to the prior art. These systems are different from the above-mentioned typical system in the characteristics of dichroic coatings and the number of separation, but they are similar to the typical conventional method in that, in order for the separated luminous flux components to be reflected totally, prisms are provided in the optical system with the mutually facing surfaces thereof disposed in parallel to each other and at a certain distance from each other, and there is formed a parallel-shaped air gap having an angle of inclination, which is not a right angle with respect to the optical axis of the system.

In general, it is known that an optical discontinuous surface not perpendicular to the optical axis acts to produce an astigmatism with respect to an image luminous flux which passes through the optical discontinuous surface. For this reason, the above-mentioned parallel air gap, which is an optical discontinuous surface in the luminous flux separating optical system, produces the astigmatism which can deteriorate the performance of the separating optical system. This can be recognized quantitatively as follows:

For the purpose of simplification of the problem, let us consider an optical system having one parallel air gap as shown in FIG. 2. If a dichroic coating and the like used for color separation are omitted, then the above-mentioned prisms can be considered as two simple prisms which have an air gap 28 between them, as shown in FIG. 2. By ray tracing a paraxial astigmatism in the optical system, it is possible to calculate easily an astigmatism $\Delta_0$ which is caused by the parallel-shaped air gap 28. That is:

$$\Delta_o = \frac{-d(n^2 - 1)\sin^2\theta}{(1 - n^2 \sin^2\theta)^{3/2}} \tag{1}$$

where $\Delta_0$: difference (t−s) between T image surface image forming position and S image surface forming position, that is, astigmatism d: thickness of air gap 28 n: index of refractive index refraction of prism glass $\theta$: angle between air gap and surface perpendicular to optical axis.

Such astigmatism $\Delta_0$ deteriorates the performance of the optical system.

SUMMARY OF THE INVENTION

The present invention aims at eliminating the drawbacks found in the above-mentioned conventional optical systems.

Accordingly, it is an object of the invention to provide a luminous flux separating optical system which prevents generation of an astigmatism caused by an air gap formed between prisms.

In order to achieve the above object, according to the invention, there is provided a luminous flux separating optical system which is formed of a plurality of prisms and includes between the prisms air gaps not perpendicular to the optical axis of the optical system, characterized in that at least one of the air gaps is formed in a wedge shape which is open on the convergent side of a luminous flux passing through the air gap.

According to the invention, due to the fact that the air gap is formed in a wedge shape which is open on the converging side of the luminous flux, the astigmatism that could occur due to the air gap formed between the mutually opposing surfaces of the prisms can be reduced to a great extent.

BRIEF DESCRIPTION OF THE DRAWINGS

The exact nature of this invention, as well as other objects, features and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENTS

Detailed description will hereunder be given of the preferred embodiments of a luminous flux separating optical system according to the present invention with reference to the accompanying drawings.

As shown by the above-mentioned equation (1), when an air gap is formed in a parallel shape, the astigmatism $\Delta_0$ that could be produced is negative, that is, the T image surface forming position is nearer to the prism than the S image surface forming position and the distance between the T and S image surface forming positions is large. Here, if the air gap is formed in a wedge shape which is open on the converging side of a luminous flux passing through the air gap, then the T image surface forming position is moved nearer to the S image surface forming position. In view of this fact, it is found that, if the angle $\delta$ of the wedge of the air gap is set at a suitable angle, then the difference between the T and S image surface forming positions, that is, the astigmatism can be decreased.

Figure 1:
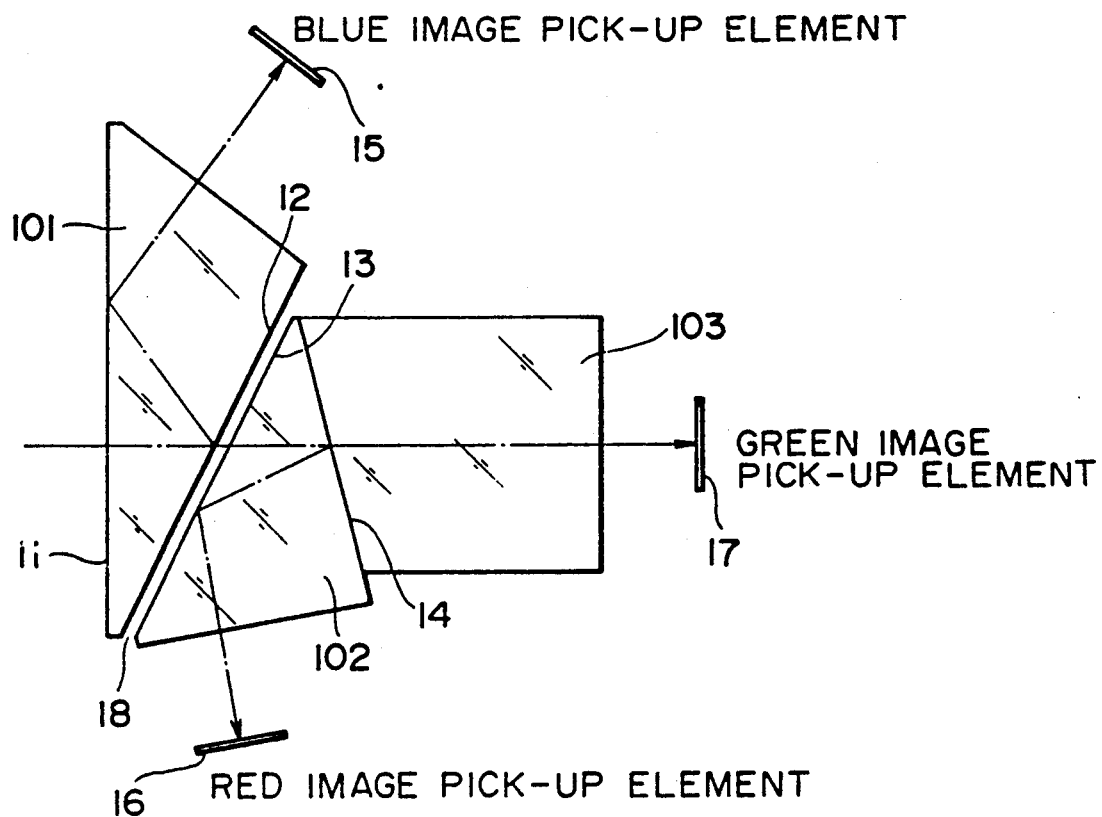
FIG. 1 is an explanatory sectional view of conventional luminous flux separating prisms.
Figure 2:
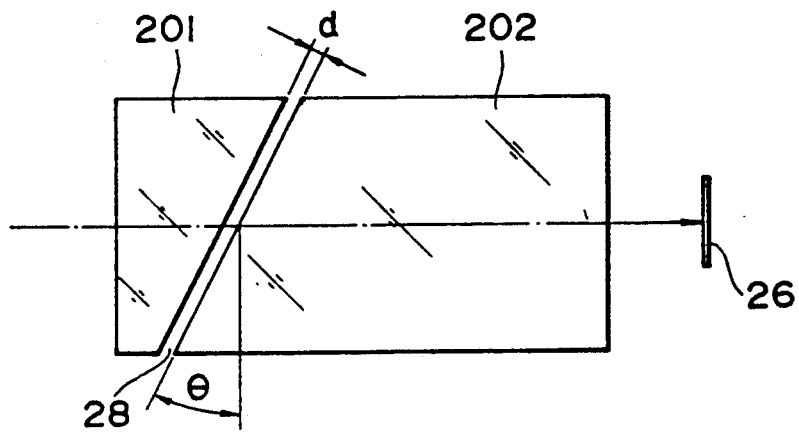
FIG. 2 is an explanatory sectional view of a simplified version of the prisms shown in FIG. 1.
Figure 3:
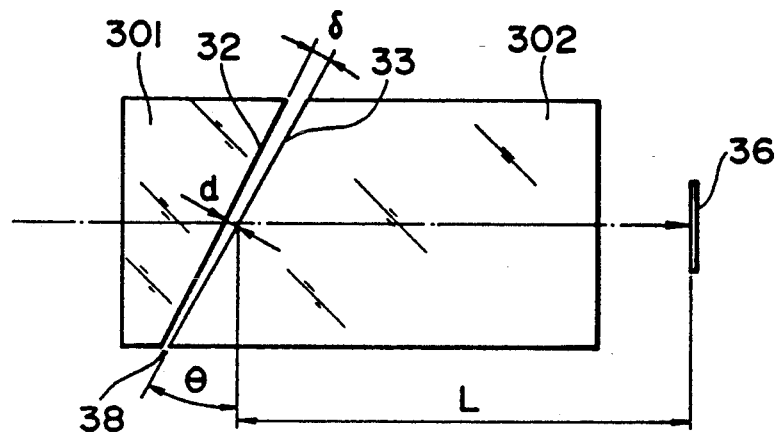
FIG. 3 is an explanatory sectional view of the principles of the present invention.

At first, let us describe the principles of the present invention in a simplified way, by way of FIG. 3 in which prisms 301, 302 forming therebetween the above-mentioned wedge-shaped air gap are shown in section.

In these prisms, by ray tracing the paraxial astigmatism thereof, the astigmatism $\Delta$ that can be produced by the air gap having the wedge angle $\delta$ can be calculated in the following manner. That is, when the wedge angle $\delta$ is sufficiently smaller than $\theta$, the astigmatism $\Delta$ can be found according to the following equation:

$$\Delta = t - s = 2\delta \frac{(n^2 - 1)\sin\theta}{n\cos^2\theta\,(1 - n^2\sin^2\theta)^{1/2}} \times (L + \Delta_o) + \Delta_o \quad (2)$$

where L designates an equivalent air thickness from the air gap to the image forming position, and $\Delta_0$ designates the astigmatism that is generated when the air gap found according to the equation (1) is a parallel-shaped air gap. Since it is believed that $\Delta_0$ is sufficiently smaller than L, the above equation (2) can be expressed as follows:

$$\Delta = t - s = 2\delta \frac{(n^2 - 1)\sin\theta \cdot L}{n\cos^2\theta\,(1 - n^2\sin^2\theta)^{1/2}} + \Delta_o \quad (3)$$

In the equation (3) if the astigmatism $\Delta = 0$ then the wedge angle $\delta$ can be found according to the following equation:

$$\delta = \frac{d \cdot n \cdot \sin\theta\,\cos^2\theta}{2 \cdot L(1 - n^2\sin^2\theta)} \quad (4)$$

In theory, when the air gap is wedged by this angle $\delta$, then the resultant astigmatism $\Delta$ is provides 0 in the paraxial. However, in practical use, the effective range of $\delta$ is obtained according to the following equation:

$$\frac{d \cdot n \cdot \sin\theta \cdot \cos^2\theta}{5L(1 - n^2\sin^2\theta)} < \delta < \frac{4d \cdot n \cdot \sin\theta \cdot \cos^2\theta}{5L(1 - n^2\sin^2\theta)} \quad (5)$$

When the wedge angle $\delta$ goes below the lower limit of the equation (5), then the resultant astigmatism is short of correction, which is undesirable. When the wedge angle $\delta$ goes beyond the upper limit of the equation (5), then the resultant astigmatism is corrected excessively, which is also undesirable.

EMBODIMENT 1

Figure 4:
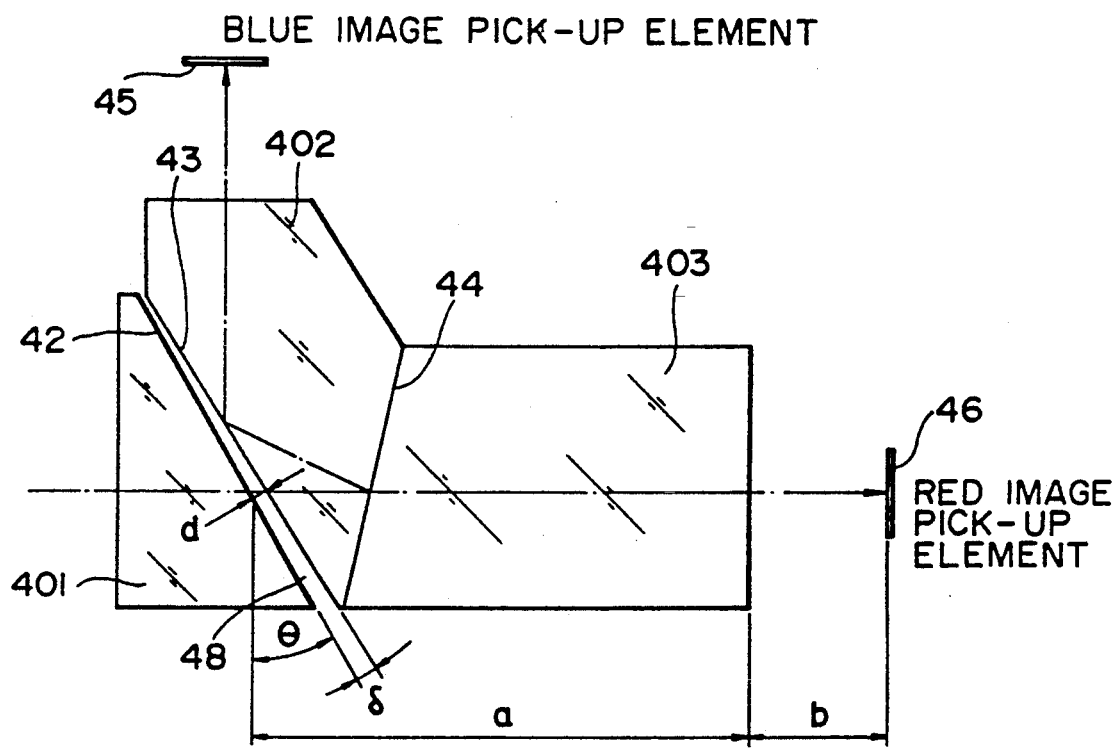
FIG. 4 is an explanatory sectional view of a first embodiment of a luminous flux separating optical system according to the invention; and, FIG. 5 is an explanatory sectional view of a second embodiment of a luminous flux separating optical system according to the invention.

As shown in FIG. 4, in this first embodiment there is used a two-color separation prism system which is composed of a first prism 401, a second prism 402 and a third prism 403. In the two-color separation prism system, a BLUE component is separated by a dichroic coating coated on a surface 44, is then totally reflected by a surface 43, and is finally image-formed on a blue image pick-up element 45. A remaining component, that is, a RED component is image-formed on a RED image pick-up element 46. An air gap 48 formed between the first and second prisms 401 and 402 is inclined by an angle of $\theta$ with respect to a surface perpendicular to the optical axis of the optical system and the distance between them is expressed as d. Also, due to the air gap 48, the distance to the converging (image forming) position thereof is an air conversion distance L which is a sum of a distance a in a medium of a refraction index n and a distance b in the air. Further, the air gap 48 is formed in a wedge shape which is open by an angle of $\delta$ on the converging side of a luminous flux which transmits therethrough.

Here, if it is assumed as follows:

$\theta = 32°$
$d = 0.02$ mm
$n = 1.755$
$a = 87.5$ mm
$b = 25$ mm
$L = a/n + b = 74.86$ mm, then it can be understood from the equation (5) that the wedge angle $\delta = 55'' \sim 3'38''$ (55 seconds to 3 minutes 38 seconds).

While the astigmatism to be generated when the air gap is formed in a parallel shape is $-0.24$ mm from the equation (1) by forming the air gap 48 as a wedge-shaped air gap in the range of the angle $\delta = 55'' \sim 3'38''$ (55 seconds to 3 minutes 38 seconds), the astigmatism can be obtained as 0.14 mm or less from the equation (3), that is, the astigmatism can be reduced to a range which provides no practical problem.

EMBODIMENT 2

Figure 5:
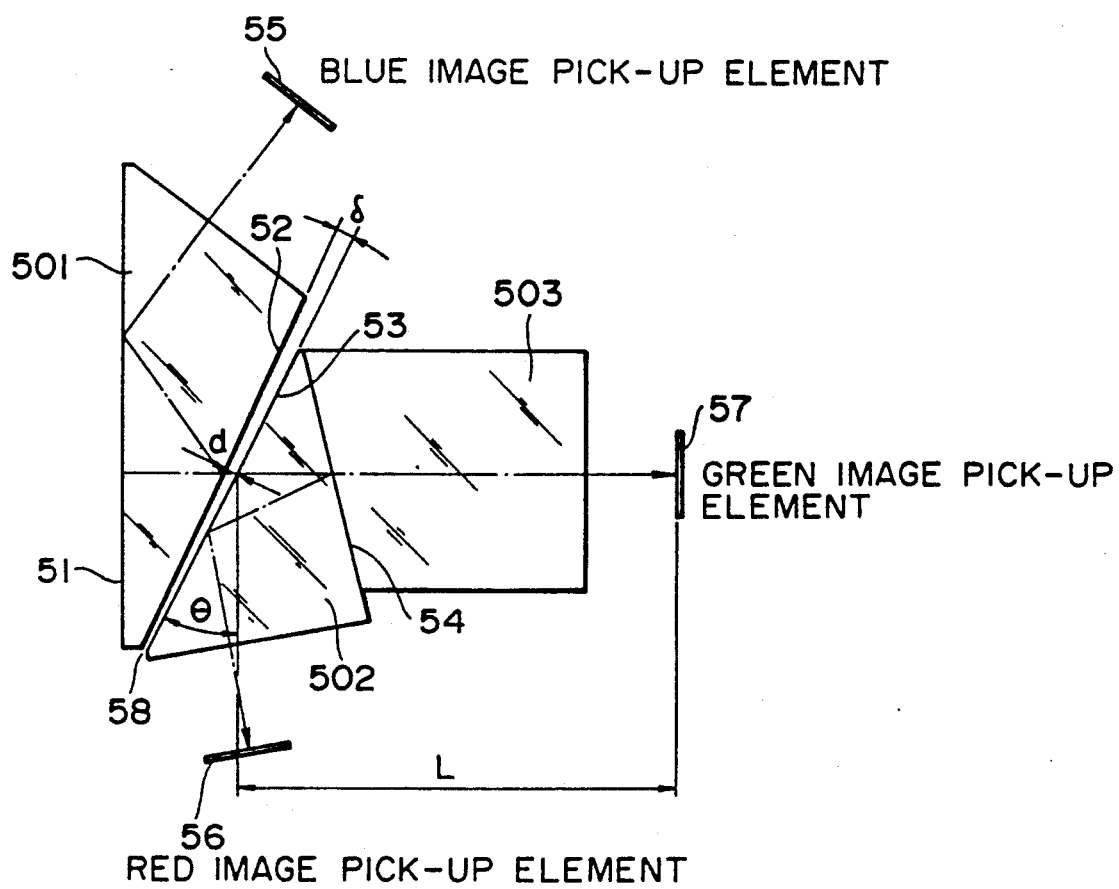

An optical system composed of a first prism 501, a second prism 502 and a third prism 503 shown in FIG. 5 relates to a three color separation optical system which can be used in a TV camera, in which an air gap is formed as a wedge air gap with an angle of $\delta$ according to the present invention. In this figure, 52 designates a dichroic coating which is used to reflect only a BLUE component, and 54 stands for a dichroic coating used to reflect only a RED component. Here, if it is assumed as follows:

$\theta = 25°$
$d = 0.02$ mm
$n = 1.611$
$L = 39.5$ mm then it can be understood from the equation (5) that the wedge angle $\delta = 22'' \sim 1'27''$ (22 seconds to 1 minutes 27 seconds).

While the astigmatism to be generated when the air gap is formed in a parallel shape is $-0.015$ mm according to the equation (1), by forming the air gap 58 as a wedged shape within the range of the above-mentioned wedge angle $\delta = 22'' \sim 1'27''$ (22 seconds to 1 minutes 27 seconds), the astigmatism can be obtained as 0.009 mm or less according to the equation (3), that is, according to the second embodiment, the astigmatism can be reduced to a small range which provides no practical problems.

In the above-mentioned embodiments, description has been given of the color separation optical systems. However, the invention is not limited to them, but the invention can also be applied to a case where one luminous flux is separated into a plurality of luminous fluxes and, in this case as well, an astigmatism to be produced within the optical system can be reduced greatly.

Further, the start point of the equivalent air thickness L which extends from the air gap to the image-forming position, as shown in FIGS. 3 and 5, may be the light entering points of the prisms 301 and 502, or may be the light leaving point of the prism 401, as shown in FIG. 4. This is the reason why the thickness of the air gap is only slight value, that is, on the order of 0.01 mm to 0.5 mm.

Also, in the embodiments shown in FIGS. 3 to 5, the light enters from the left side in these figures and is then image-formed. However, the present invention is not limited to this but, for example, the light source may be disposed at the image-forming position, whereby the light can be diffused in the left direction and can be emitted toward the prism. In this case as well, if the wedge shape is formed in such a manner that it is open on the side of the light source, then the astigmatism can be reduced.

As has been described heretofore, according to the luminous flux separating optical system of the invention, the astigmatism to be produced due to the air gap formed between the prisms can be reduced to a great extent. Thanks to this, the present invention can improve the image-forming performance of an optical system which includes a plurality of luminous flux separating prisms.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A luminous flux separating optical system comprising:
   a plurality of prisms; and
   an air gap between the plurality of prisms which is not perpendicular to an optical axis of said optical system;
   wherein said air gap is a wedge shape, open on a converging side of a luminous flux passing through said air gap;
   wherein a wedge angle, δ, of said air gap equals:

$$\delta = \frac{d \cdot n \cdot \sin\theta \cos^2 \theta}{2 \cdot L (1 - n^2 \sin^2 \theta)}$$

where
d = thickness of a center of said air gap,
n = refractive index of said plurality of prisms,
θ = angle formed between said air gap and a surface perpendicular to the optical axis, and
L = equivalent air thickness from said air gap to an image-forming position.

2. The luminous flux separating optical system of claim 1, wherein the said luminous flux separating optical system is a two-color optical system.

3. The luminous flux separating optical system of claim 1, wherein the said luminous flux separating optical system is a three-color optical system.

4. The luminous flux separating optical system of claim 1, wherein said air gap is open on a converging side of a luminous flux passing through said air gap.

5. The luminous flux separating optical system of claim 1, wherein said air gap is open on a side adjacent to a light source.

6. An optical system comprising:
   a first prism;
   a second prism;
   a third prism;
   an air gap formed between said first and second prisms, wherein said air gap is not perpendicular to an optical axis of said optical system; and
   a dichroic coating on adjacent surfaces of said second and third prisms; wherein said air gap is a wedge shape, open on a converging side of a luminous flux passing through said air gap wherein a wedge angle, δ, of said air gap equals:

$$\delta = \frac{d \cdot n \cdot \sin\theta \cos^2 \theta}{2 \cdot L(1 - n^2 \sin^2 \theta)}$$

where
d = thickness of a center of said air gap,
n = refractive index of said plurality of prisms,
θ = angle formed between said air gap and a surface perpendicular to the optical axis, and
L = equivalent air thickness from said air gap to an image-forming position.

7. The optical system of claim 6, wherein said first and second prisms separate first and second components of the luminous flux and said dichroic coating reflects the first component of the luminous flux and allows the second component of the luminous flux to pass therethrough.

8. The system of claim 6, wherein said air gap is open on a converging side of a luminous flux passing through said air gap.

9. An optical system comprising:
   a first prism;
   a second prism;
   a third prism;
   a first dichroic coating on said first prism;
   an air gap not perpendicular to the optical axis of the optical system between the first and second prisms; and
   a second dichroic coating on adjacent surfaces of said second and third prisms;
   wherein said air gap is a wedge shape, open on a converging side of a luminous flux passing through said air gap wherein a wedge angle, δ, of said air gap equals:

$$\delta = \frac{d \cdot n \cdot \sin\theta \cos^2 \theta}{2 \cdot L(1 - n^2 \sin^2 \theta)}$$

where
d = thickness of a center of said air gap,
n = refractive index of said plurality of prisms,
θ = angle formed between said air gap and a surface perpendicular to the optical axis, and
L = equivalent air thickness from said air gap to an image-forming position.

10. The optical system of claim 9, wherein said first, second and third prisms separate first, second, and third components of the luminous flux, said first dichroic coating reflects the first component of the luminous flux and allows the second and third components of the luminous flux to pass therethrough, and said second dichroic coating reflects the second component and allows the third component to pass therethrough.

11. The optical system of claim 9, wherein said air gap is open on a side adjacent to a light source.

12. The optical system of claim 9, wherein said air gap is open on a converging side of a luminous flux passing through said air gap.

13. The optical system of claim 9, wherein said air gap is open on a side adjacent to a light source.

14. An optical system comprising:
a first prism;
a second prism;
a third prism;
an air gap formed between said first and second prisms, wherein said air gap is not perpendicular to an optical axis of said optical system; and
a dichroic coating on adjacent surfaces of said second and third prisms; wherein said air gap is a wedge shape, open on a converging side of a luminous flux passing through said air gap wherein a wedge angle, δ, of said air gap is between:

$$\frac{d \cdot n \cdot \sin\theta \cdot \cos^2\theta}{5L(1 - n^2 \sin^2\theta)} \text{ and } \frac{4d \cdot n \cdot \sin\theta \cdot \cos^2\theta}{5L(1 - n^2 \sin^2\theta)}$$

where
d = thickness of a center of said air gap,
n = refractive index of said plurality of prisms,
θ = angle formed between said air gap and a surface perpendicular to the optical axis, and
L = equivalent air thickness from said air gap to an image-forming position.

15. The optical system of claim 14, wherein said first and second prisms separate first and second components of the luminous flux and said dichroic coating reflects the first component of the luminous flux and allows the second component of the luminous flux to pass therethrough.

16. The system of claim 14, wherein said air gap is open on a converging side of a luminous flux passing through said air gap.

17. An optical system comprising:
a first prism;
a second prism;
a third prism;
a first dichroic coating on said first prism;
an air gap not perpendicular to the optical axis of the optical system between the first and second prisms; and
a second dichroic coating on adjacent surfaces of said second and third prisms;
wherein said air gap is a wedge shape, open on a converging side of a luminous flux passing through said air gap wherein a wedge angle, δ, of said air gap is between:

$$\frac{d \cdot n \cdot \sin\theta \cdot \cos^2\theta}{5L(1 - n^2 \sin^2\theta)} \text{ and } \frac{4d \cdot n \cdot \sin\theta \cdot \cos^2\theta}{5L(1 - n^2 \sin^2\theta)}$$

where
d = thickness of a center of said air gap,
n = refractive index of said plurality of prisms,
θ = angle formed between said air gap and a surface perpendicular to the optical axis, and
L = equivalent air thickness from said air gap to an image-forming position.

18. The optical system of claim 17, wherein said first, second and third prisms separate first, second, and third components of the luminous flux, said first dichroic coating reflects the first component of the luminous flux and allows the second and third components of the luminous flux to pass therethrough, and said second dichroic coating reflects the second component and allows the third component to pass therethrough.

19. The optical system of claim 17, wherein said air gap is open on a side adjacent to a light source.

20. The optical system of claim 17, wherein said air gap is open on a converging side of a luminous flux passing through said air gap.

21. The optical system of claim 17, wherein said air gap is open on a side adjacent to a light source.

22. A luminous flux separating optical system comprising:
a plurality of prisms; and
an air gap between the plurality of prisms which is not perpendicular to an optical axis of said optical system;
wherein said air gap is a wedge shape, open on a converging side of a luminous flux passing through said air gap;
wherein a wedge angle, δ, of said air gap equals:

$$\frac{d \cdot n \cdot \sin\theta \cdot \cos^2\theta}{5L(1 - n^2 \sin^2\theta)} \text{ and } \frac{4d \cdot n \cdot \sin\theta \cdot \cos^2\theta}{5L(1 - n^2 \sin^2\theta)}$$

where
d = thickness of a center of said air gap,
n = refractive index of said plurality of prisms,
θ = angle formed between said air gap and a surface perpendicular to the optical axis, and
L = equivalent air thickness from said air gap to an image-forming position.

23. The luminous flux separating optical system of claim 22, wherein the said luminous flux separating optical system is a two-color optical system.

24. The luminous flux separating optical system of claim 22, wherein the said luminous flux separating optical system is a three-color optical system.

25. The luminous flux separating optical system of claim 22, wherein said air gap is open on a converging side of a luminous flux passing through said air gap.

26. The luminous flux separating optical system of claim 22, wherein said air gap is open on a side adjacent to a light source.

* * * * *